United States Patent
Stiegler et al.

[19]

[11] Patent Number: 6,137,803
[45] Date of Patent: Oct. 24, 2000

[54] COMMUNICATION SYSTEM

[75] Inventors: Andreas Stiegler, Ettlingen; Patrick Heck, Durmersheim; Herbert Hetzel, Schwaigen, all of Germany

[73] Assignees: Silicon Systems GmbH Multimedia Engineering, Karlsruhe; Becker GmbH, Karlsbad, both of Germany

[21] Appl. No.: 08/949,723

[22] Filed: Oct. 14, 1997

[30] Foreign Application Priority Data

Oct. 11, 1996 [DE] Germany .......................... 196 41 930

[51] Int. Cl.[7] .............................. H04L 12/28; H04L 12/56
[52] U.S. Cl. ............................................ 370/403; 370/421
[58] Field of Search .................................... 370/403, 404, 370/405, 406, 410, 419, 420, 421, 424, 452, 462, 470, 472, 509, 510, 512, 329, 349, 350, 359, 257, 258, 285, 341, 345, 356, 379, 389, 394, 395, 396, 399, 422, 423

[56] References Cited

U.S. PATENT DOCUMENTS

| | | | |
|---|---|---|---|
| 4,451,916 | 5/1984 | Casper et al. ............................ | 370/226 |
| 5,007,050 | 4/1991 | Kasparian et al. ...................... | 370/366 |
| 5,166,926 | 11/1992 | Cisneros et al. ......................... | 370/392 |
| 5,361,261 | 11/1994 | Edem et al. ............................. | 370/445 |

*Primary Examiner*—Dang Ton
*Assistant Examiner*—Phirin Sam
*Attorney, Agent, or Firm*—Herbert L. Lerner; Laurence A. Greenberg; Werner H. Stemer

[57] ABSTRACT

The communication system has a plurality of subscribers connected through respective interface circuits to a ring feeder for the common transmission of digital source data and control data. The source data and control data are transmitted in a format which prescribes a pulsed sequence of individual bit groups of equal length. The bit groups are subdivided into component bit groups each forming a data channel. At least one date channel is provided for control data which are transmitted in data packets with a destination address. Furthermore, the interface circuit of each subscriber contains an address decoder. The communication system is simplified, and changes to the system are made easier in that at least one subscriber has a special address by means of which a received data packet is fed directly to an instruction decoder inside the interface circuit, which decodes to the bit base an instruction code contained in the data packet. The interface circuit, i.e., the subscriber reacts immediately to a corresponding instruction in the instruction code.

20 Claims, 4 Drawing Sheets

COMMUNICATION SYSTEM

BACKGROUND OF THE INVENTION

1. Field of the Invention

The invention relates to a communication system with a plurality of subscribers which are connected by means of an interface circuit to a ring feeder for the common transmission of digital source data and control data; the source data and control data are transmitted in a format which prescribes a pulsed sequence of individual bit groups of equal length which are subdivided into component bit groups which form a respective data channel; at least one data channel is provided for control data which are transmitted in data packets with a destination address; the interface circuit of each subscriber contains an address decoder.

Such communication systems are used wherever different types of electric and electronic devices which are to exchange information with one another in a partially complicated way are networked to one another by means of data lines of physically simple design. The subscribers can exchange both source data and control data via these data lines. For example, in an audio application it is possible to transmit audio data from data sources such as CD players, radio receivers and cassette players to data sinks such as amplifier/loudspeaker combinations, and control data can be transmitted at the same time, for example to control the volume of the system. In this case, a device can be designed simultaneously as a data source and a data sink, such as is the case with a cassette recorder, for example.

2. Description of the Related Art

A method for the common transmission of source data and control data between data sources and data sinks connected via data lines is described in general in European patent disclosure EP 0 725 522 (incorporated by reference). The method is also described in the printed publication "OCC8001 'CONAN' OPTICAL TRANSCEIVER", C&C Electronics Ltd., 1996, which shows in detail an interface circuit for connecting individual subscribers to the ring feeder. Since the interface circuit does not have its own intelligence, it is capable of operating only in combination with a microcontroller, a microprocessor set up for the special control tasks in the system, which is capable of interpreting an instruction communicated within the framework of control data in accordance with the protocol used in the system, and which then controls the interface circuit or a subscriber associated therewith in accordance with the instruction.

The correct interpretation of the instructions in the microcomputer presupposes that the microcomputer of all the subscribers of the communication system has a standard protocol. If the functionality of the system is changed, for example by adding a new subscriber, it is also necessary to recreate or change the instruction interpreter.

SUMMARY OF THE INVENTION

It is accordingly an object of the invention to provide a TITLE, which overcomes the above-mentioned disadvantages of the heretofore-known devices and methods of this general type and which simplifies the above-described communication system and which render it easier to make changes to the system.

With the foregoing and other objects in view there is provided, in accordance with the invention, a communication system with a plurality of subscribers which are connected via respective interface circuits to a ring feeder and a method of transmitting in common digital source data and control data in a format which prescribes a pulsed sequence of individual bit groups of equal length. The method comprises the following steps:

transmitting data in bit groups of equal length and subdividing the bit groups into component bit groups each forming a data channel;

assigning at least one of the data channels for control data which are transmitted in data packets including a destination address; providing the interface circuit of each subscriber with an address decoder and an instruction decoder;

defining at least one of the subscribers with a special address by which a data packet received thereby is communicated directly to the instruction decoder in the interface circuit, and decoding, with the instruction decoder, bits of an instruction code contained in the data packet; and directly responding to an instruction in the instruction code and performing the instruction with the interface circuit or the subscriber.

In other words, at least one subscriber has a special address by means of which a received data packet is fed directly to an instruction decoder inside the interface circuit. The decoder decodes to the bit base an instruction code contained in the data packet, and the interface circuit, i.e. the subscriber reacts immediately to a corresponding instruction in the instruction code.

In the prior art, an instruction received by a subscriber with a destination address corresponding to this subscriber, is fed to a microcontroller without regard to the contents of the instruction, and is interpreted there. In contrast, here an instruction with the special address is not interpreted with the aid of any sort of protocol, but is immediately executed. The invention is best realized, for example, by writing the bit values of the instruction directly into a control register which determines operational states of the subscriber with the special address. In this case, the decoding constitutes writing the instruction code in a bitwise fashion into the control register, and the reaction to the instruction consists in the subscriber setting its operational state automatically in accordance with the contents of the control register. The subscriber which transmits the instruction knows which values of the control register correspond to which operational state of the receiver of the instruction, and sets the bits contained in the instruction appropriately from the very first.

Furthermore, there can be special instructions to store data transmitted in the data packet in the interface circuit. These instructions consequently entail write procedures. Furthermore, there can be instructions to reset or to calibrate the subscriber with the special address.

Owing to the control actions by means of special instructions which require no interpretation in any sort of procedure-orientated programming language, it is possible to economize on a microcontroller for some subscribers. This results in a reduction in power consumption. Omitting the microcontroller is expedient, in particular, with subscribers which do not themselves transmit data but only receive them and need to react to specific instructions such as, for example, in the case of an amplifier/loudspeaker combination which receives audio data and also control data for the volume. However, the invention also offers advantages in the case of subscribers which have their own microcontroller. An existing microcontroller is relieved by writing frequently updated data, for example a table with the position of all the subscribers in the ring, directly into appropriate registers of the subscriber.

In accordance with an added feature of the invention, at least one instruction is an instruction for data or statuses stored in the interface circuit of the subscriber with the special address to be returned over the ring feeder, preferably embedded in the received data packet. In this case, the decoding consists in detecting the instruction as a read request, and the reaction to the instruction consists in returning the data packet together with the interrogated data. Since there is no interpretation of the instruction, the interrogating subscriber obtains an answer in the shortest time, since it can receive the interrogated information in the same bit group or the same bit groups in which it sent the read instruction. In the prior art, such read actions are performed in two separate messages, a request and an answer. The reaction time is thereby undefined. Furthermore, the interrogated subscriber must be secured against other instances of access in the meantime until the entire action is concluded. By contrast, the invention enables a subscriber to read out the contents of another subscriber in a single access. The transmission time is deterministic and, moreover, a very much shorter transmission time is required.

The data packets transmitted within the framework of such a read action can, moreover, contain check codes which are generated during transmission or return. Consequently, the correct transmission of the data can likewise be checked in an action, whereby only a single data packet runs through the network.

In all the cases described above, the interface circuits of all the subscribers can be of identical design. This simplifies the realization of the communication system and makes it cost-effective. The novel communication system thus welcomes subscribers with a microcontroller and subscribers without a microcontroller.

In order to transmit the control data packets in the case of the actions described above, it is possible to use data channels which are formed in a known way by specific individual bit positions in a bit group. The bit positions of a plurality of successive bit groups are thereby combined to form a control data block of defined length.

In accordance with an additional feature of the invention, the control data packets are transmitted via a data channel for which it is possible to reserve a coherent region of arbitrary size of the bit positions for the source data within a bit group. Consequently, even relatively long data packets such as can occur, for example, in the case of the above-described read action, can be transmitted very quickly in conjunction with optimum utilization of the existing total transmission capacity.

A data packet-transmitting subscriber can write successive bits of a data packet to be transmitted into mutually adjacent bit positions which are reserved for the data packet transmission. Any data packet which contains more bit positions than the reserved region of a bit group allows can be transmitted in the data packet regions of a plurality of successive bit groups. The bit positions for source data which are transmitted in a continuous data stream likewise preferably form a contiguous (coherent) region, the region for the source data which are transmitted in a continuous data stream, and the region for the data which are transmitted in data packets adjoining one another. The boundary between the region for the source data which are transmitted in a continuous data stream, and the region for the data which are transmitted in data packets can either be permanently set or it may be set in real-time during ongoing operation in accordance with the transmission capacity currently required.

All the subscribers in the ring can participate in the exchange of control data irrespective of which application software or which protocol is used, specifically by virtue of their physical address and the transmission mechanism embedded in the physical layer. Only the destination address is announced, the rest is performed in the subscribers or in the associated interface circuit.

This is not possible for source data which are transmitted in a continuous data stream (designated below as synchronous data). Each subscriber which wishes to transmit source data in a continuous data stream must be allocated a specific data channel. A method for decentralized management of data transmission which permits good utilization of data channels is described in European patent disclosure EP-A-0 752 520, which is herewith incorporated by reference. However, the preconditions for access must be negotiated via a higher-order protocol, all the subscribers needing to have the same network management structure and the complete information for the current channel assignment. This presupposes for all the subscribers a protocol which is the same in this region and which makes demands on a relatively high proportion of the system resources of each subscriber, that is to say a great deal of storage space, computing power and time.

The fast control actions or read actions according to the invention make it possible for the channel assignment information to be managed more centrally which permits a similarly simple and direct treatment, as in the case of the exchange of control data. Not all the subscribers need have the same information in this process.

In addition, the knowledge of all the used and unused data channels is held at only one site. This is preferably the subscriber which is first to be switched on in the communication system and generates the clock pulse in which the bit groups are transmitted and to which all the other subscribers conform. Since this subscriber is unique, a decision process as to which subscriber should keep the complete knowledge of the current channel allocation is eliminated. This subscriber, which is also termed the clock pulse generator below, undertakes for all the other channels to allocate them on request, and propagates the respectively valid channel allocation information on the communication network, for example, in the form of an allocation table. Every subscriber can now, if required, extract the information corresponding to its requirements from the information spectrum on offer. Consequently, each subscriber need only manage the information affecting itself, and no longer the entire connection information of the communication network. A higher-order conflict management is eliminated.

A subscriber which would like to transmit synchronous data requests a free channel of the clock pulse generator, specifically by means of a read action described above. The currently valid allocation table or only the part thereof relevant to the requesting subscriber is then read out from the clock pulse generator. The subscriber which would like to transmit selects a free channel from the allocation table. An additional item of information of the requesting subscriber at the clock pulse generator is not required according to the invention since the clock pulse generator has itself prompted the allocation.

The clock pulse generator changes the allocation table appropriately and announces the changed allocation table on the communication network, preferably at regular intervals.

If the changed allocation table is propagated in a quick control action as described above, which is, in this case, a write action, then the allocation table can be announced so frequently that a subscriber which would like to transmit synchronous data can await the allocation table next propagated in order to select a channel therefrom. There is no need for an action to request a channel in this case.

In accordance with a further feature of the invention, the ring feeder is formed by optical fibers interconnecting two respective subscribers. Optical fibers permit very high data transmission rates. Moreover, in the case of a communication system in a motor vehicle the low weight of optical fibers is particularly advantageous. However, the invention is also suitable for purely electric annular communication networks in which the line segments are, for example, coaxial cables.

Other features which are considered as characteristic for the invention are set forth in the appended claims.

Although the invention is illustrated and described herein as embodied in a communication system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying figures of the drawing.

DESCRIPTION OF THE PREFERRED EMBODIMENTS

Figure 1:
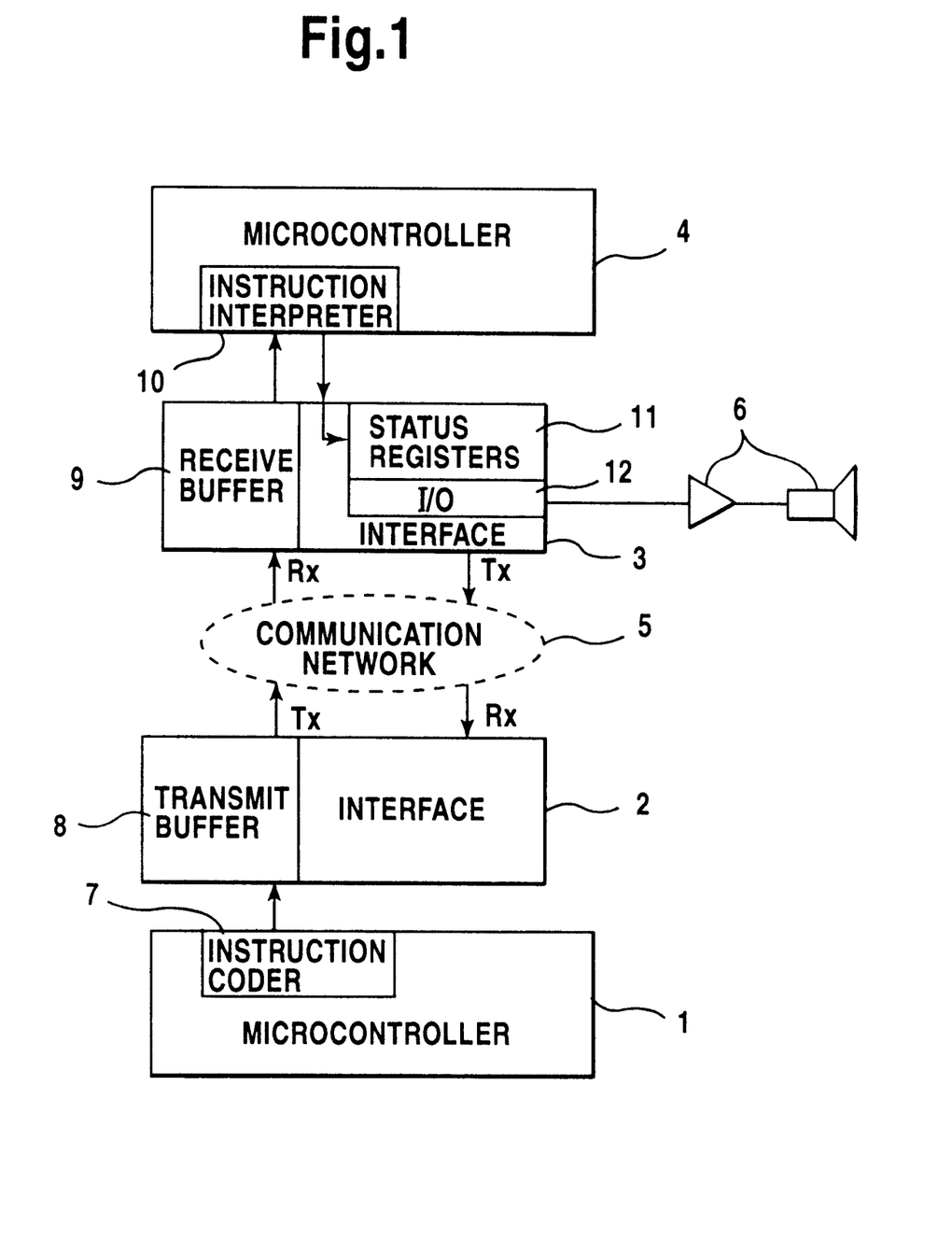
FIG. 1 is a schematic view of the interface circuits and microcontrollers of two communication subscribers connected by means of a ring feeder according to prior art control sequence.

Referring now to the figures of the drawing in detail and first, particularly, to FIG. 1 thereof, there is seen a microcontroller 1 and an interface circuit 2 of a first electronic device, as well as an interface circuit 3 and a microcontroller 4 of a second electronic device. The two electronic devices are respectively connected via the interface circuits 2 and 3 to a diagrammatically represented annular communication network 5. The communication network 5 contains a plurality of optical-fiber segments which in each case lead from a transmit terminal Tx of an interface circuit to a receive terminal Rx of another interface circuit, with the result that a ring feeder is formed. A transmit terminal Tx and a receive terminal Rx in each case contain an opto-electronic transducer for converting electronic signals into optical signals or vice versa.

In this example, the first electronic device may be a radio set at which a user inputs a command, say, that the reproduction volume of the second electronic device, which contains an amplifier/loudspeaker combination 6, is to be changed. If a plurality of programs are being transmitted simultaneously via the communication network, it can also be desired, for example, to change the program currently being reproduced. In order to achieve this, the application software in the microcontroller 1, which comprises an instruction coder 7 must employ the protocol used in the communication system to write a control message into a transmit buffer 8 of the interface circuit 2, and start the transmission via the communication network 5. Such a control message is generally a data packet which contains the destination address of the second electronic device or communication subscriber, and an instruction code.

When the control message arrives at the interface circuit 3, it is detected by means of the destination address as intended for the amplifier/loudspeaker combination 6 and written into a receive buffer 9 of the interface circuit 3. The microcontroller 4 reads the control message out of the receive buffer 9 and interprets the control message with the aid of an item of software corresponding to the protocol, an instruction interpreter 10. By interpreting the control message in the instruction interpreter 10, the microcontroller 4 can determine the actual values which lead to the desired change in the operational state of the amplifier/loudspeaker combination 6. The current values of the operational state of the amplifier/loudspeaker combination 6 are stored in the form of individual bits in control and status registers 11 of the interface circuit 3. The microcontroller 4 changes the control values in the control and status registers 11 in accordance with the desired operational state, and the changed control values have the effect that input/output circuits 12 of the interface circuit 3, for example, program switches or digital-to-analog converters for generating an analog signal which determines the volume direct the desired signal to the amplifier/loudspeaker combination 6.

Figure 2:
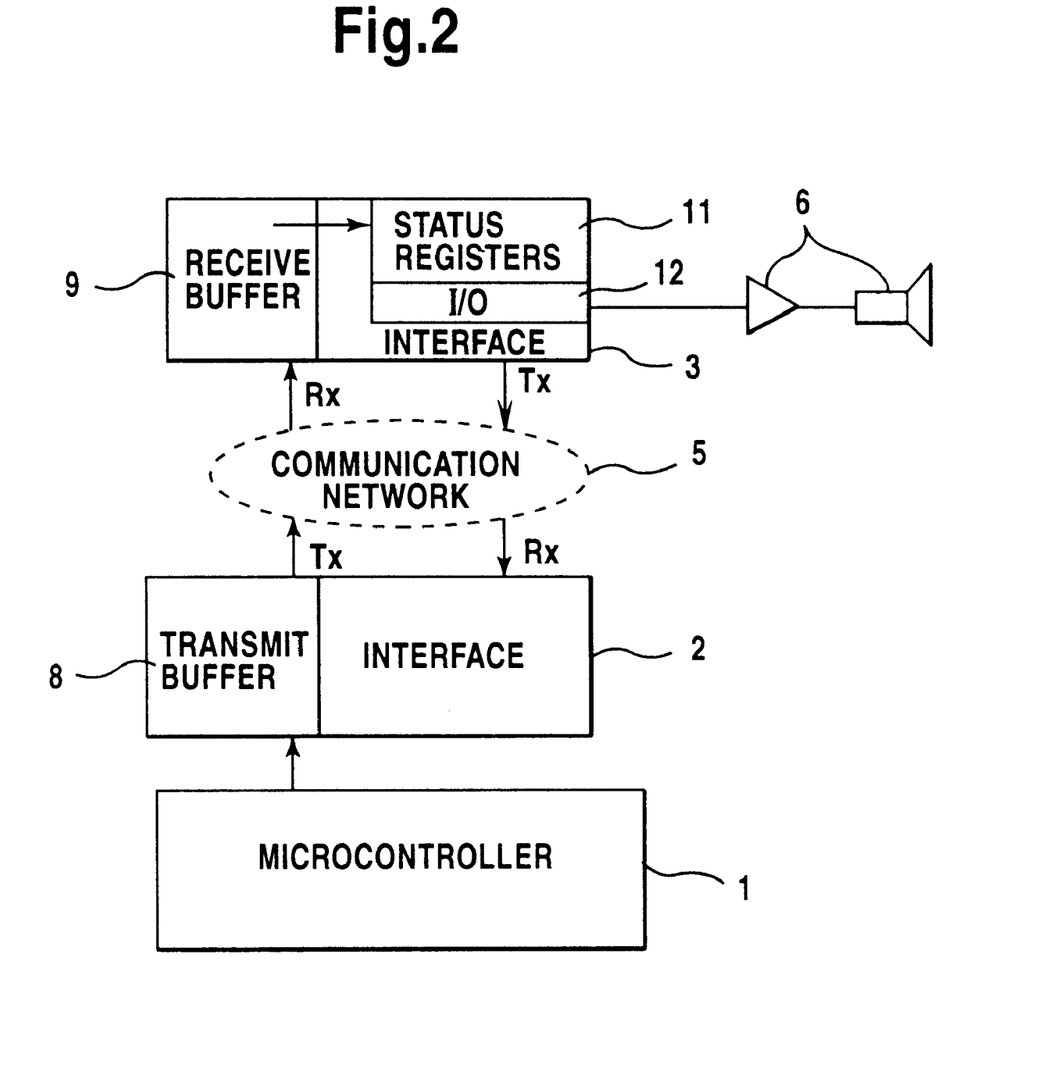
FIG. 2 is a view similar to FIG. 1, omitting one microcontroller and illustrating a control sequence in accordance with the invention.

Insofar as the configuration according to the invention illustrated in FIG. 2 is similar to the above-described prior art, identical reference symbols have been used. In contrast with the prior art, a subscriber such as the amplifier/loudspeaker combination 6, which participates essentially passively in the communication on the network, requires no microcontroller 4. This is made possible by the special control of the amplifier/loudspeaker combination 6 in accordance with the novel communication network 5, as described in the following.

In order, for example, to change the volume of the amplifier/loudspeaker combination 6, or to change the program reproduced, the microcontroller 1 determines which values are required in the control and status registers 11 of the interface circuit 3 in order to accomplish the desired change. This is performed irrespective of the protocol used in the system. These values are provided with a special destination address, written into the transmit buffer 8 of the interface circuit 2, and transmitted via the communication network 5. When the interface circuit 3 receives the data packet with the special destination address, it writes the data following the destination address directly out of the receive buffer 9 into the control and status registers 11. The changed control values have the effect that the input/output circuits 12 on the interface circuit 3 direct the desired signal to the amplifier/loudspeaker combination 6.

The interface circuit 3 thus has an instruction decoder which reacts to the special destination address by writing the contents of the receive buffer 9 directly into the control and status registers 11.

Thus, the subscriber with the amplifier/loudspeaker combination 6 does not require its own microprocessor with, in this case, overdimensioned "intelligence", but only the standardizable interface circuit 3, digital-to-analog converter, amplifier and loudspeaker. An active loudspeaker for direct connection to the communication network 5 can therefore be produced very cost-effectively. The probability of control errors is lower, and because of the independence of the control from a higher-order protocol which has to be announced to all the subscribers, it is easier to carry out changes or extensions to the communication system.

It is also possible for any other values stored in the interface circuit 3 to be set in the same way as described above via the communication network 5. For example, a table with the position of all the subscribers in the ring can be continuously updated; it specifies to an active loudspeaker its position in the ring with reference to further loudspeakers and, if appropriate, effects a signal delay so that propagation time differences in the communication network 5 do not lead to phase shifts in the acoustic signals. Further examples for control signals by means of which individual interface circuits in the ring can be addressed directly without a microcontroller being told thereof or even being required therefor are, for example, signals for initializing, resetting or calibrating one or more subscribers.

The described method of controlling without the use of a microcontroller can also be expedient even in the case of a subscriber which has one. This subscriber then receives two or more addresses. Data packets with one address are relayed to the microcontroller, and the bits of data packets with another address are stored directly in registers assigned to this address or fed to an electronic device or device part of the subscriber.

The described instruction decoding to the bit base with immediate reaction of a subscriber further renders it possible to read out data or statuses in a subscriber in one access. This is explained in conjunction with FIGS. 3 to 5.

Figure 3:
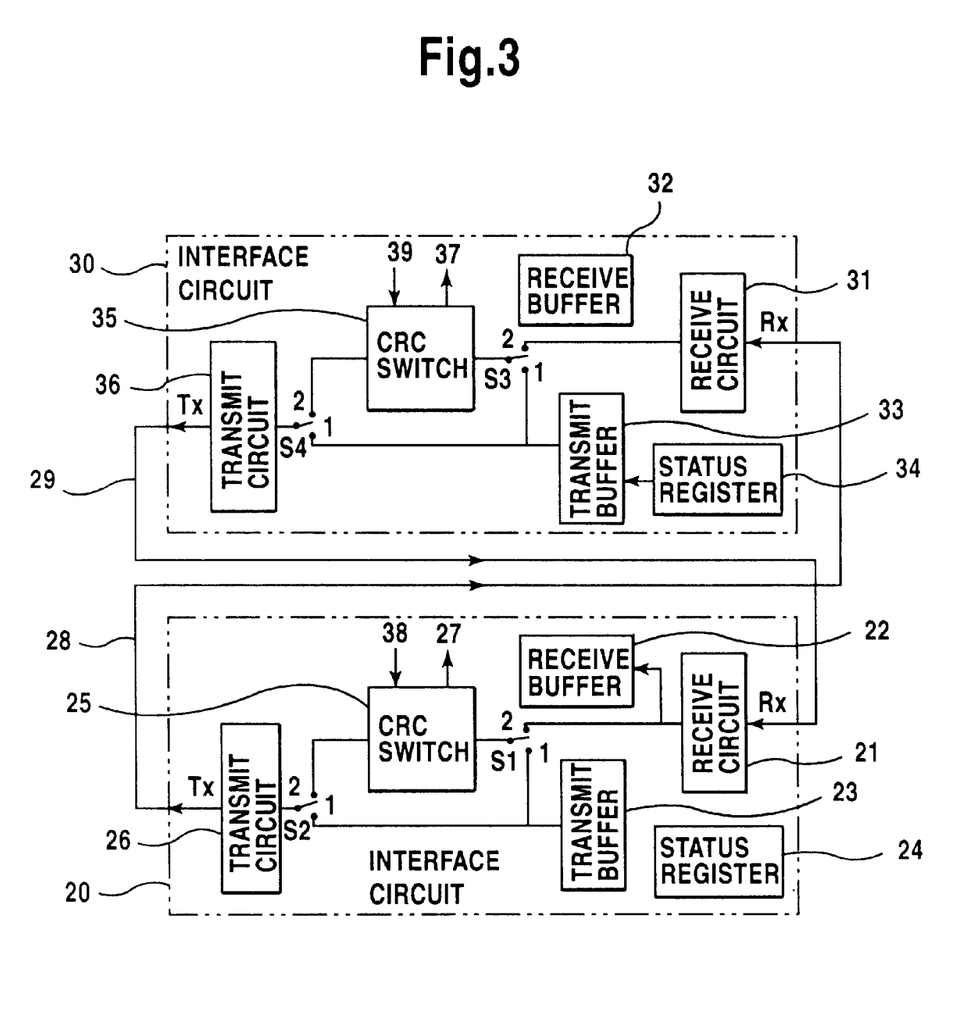
FIG. 3 is a detailed diagrammatic view of the interface circuits of two subscribers, illustrating a read procedure according to the invention.

FIG. 3 shows in dashed and dotted lines two interface circuits 20 and 30 which each belong to a subscriber in the communication system. The interface circuits 20 and 30 are interconnected via two optical fibers 28 and 29 which lead in each case from a transmit terminal Tx of an interface circuit 20, 30 to a receive terminal Rx of the other interface circuit 30 or 20, respectively. The ring feeder formed by the optical fibers 28 and 29 can comprise still further optical fibers which incorporate the interface circuits of further subscribers into the ring.

The interface circuit 20 contains a receive circuit 21 at the receive terminal Rx, a receiver buffer 22, a transmit buffer 23, a status register 24, a so-called CRC switching mechanism 25, a switching mechanism for carrying out a check sum method, and a transmit circuit 26 at the transmit terminal Tx. A changeover switch S1 contains a changeover contact which is connected to the CRC switching mechanism 25, and two fixed contacts, which are connected to the receive circuit 21 and to the transmit buffer 23, respectively. A changeover switch S2 contains a changeover contact which is connected to the transmit circuit 26, and two fixed contacts, which are connected to the CRC switching mechanism 25 and to the transmit buffer 23, respectively.

The interface circuit 30 has the same configuration as the interface circuit 20 and contains a receive circuit 31 at the receive terminal Rx, a receive buffer 32, a transmit buffer 33, status register 34, a CRC switching mechanism 35 and a transmit circuit 36 at the transmit terminal Tx. A changeover switch S3 contains a changeover contact which is connected to the CRC switching mechanism 35, and two fixed contacts, which are connected to the receive circuit 31 and the receive buffer 33, respectively. A changeover switch S4 contains a changeover contact, which is connected to the transmit circuit 36, and two fixed contacts, which are connected to the CRC switching mechanism 35 and the transmit buffer 33, respectively.

When the subscriber with the interface circuit 20 would like to read out the status registers 34 of the interface circuit 30, it starts a read message, which is a data packet which sequentially contains the destination address of the subscriber with the interface circuit 30, an instruction code which indicates the read instruction, and a group of empty bytes.

With the start of the transmission, the two CRC switching mechanisms 25 and 35 are reset to zero by reset signals 38 and 39. In the interface circuit 20, the changeover switch S1 is set to the position 1, and the changeover switch S2 is set to the position 1. In the interface circuit 30, the changeover switch S3 is set to the position 2 and the changeover switch S4 is set to the position 2. The interface circuit 20 transmits the destination address and the instruction code of the read message from the transmit buffer 23 via the transmit circuit 26 and the optical fiber 28 to the receive circuit 31 of the interface circuit 30, and in so doing calculates a corresponding check code or check value 27 in the CRC switching mechanism 25.

When no error occurs during transmission, the CRC switching mechanism 35 calculates in the interface circuit 30 from the destination address and the instruction code a check value 37 which corresponds to the check value 27. Thereafter, the interface circuit 20 sets the changeover switch S1 to the position 2, and the interface circuit 30 sets the changeover switch S3 to the position 1. The value or values, specified by the instruction code, from the status registers 34 are now transmitted by the interface circuit 30 via the transmit buffer 33, the CRC switching mechanism 35, the transmit circuit 36 and the optical fiber 29 to the receive circuit 21, the CRC switching mechanism 25 and into the receive buffer 22 of the interface circuit 20. In this case, the corresponding check value is further calculated respectively in the CRC switching mechanisms 25 and 35. If no transmission error has occurred, the check values 27 and 37 are still identical. Finally, the interface circuit 30 puts the changeover switch S4 to the position 2 and transmits the calculated check value 37 via the transmit circuit 36 and the optical fiber 28 to the receive circuit 21 of the interface circuit 20 and the CRC switching mechanism 25 thereof. After the check value has been calculated in the CRC switching mechanism 25 using the check value 37 from the interface circuit 30, this resulting value can be used to make the following statements:

1) When the resulting check value in the CRC switching mechanism 25 is equal to zero, the transmission was error-free. The question (the destination address and the read instruction) as well as the answer belong together and are correct.

2) When the resulting check value in the CRC switching mechanism 25 is not equal to zero, the transmission was incorrect. The question and/or answer are not valid. The read instruction can be repeated, if appropriate.

Figure 4:
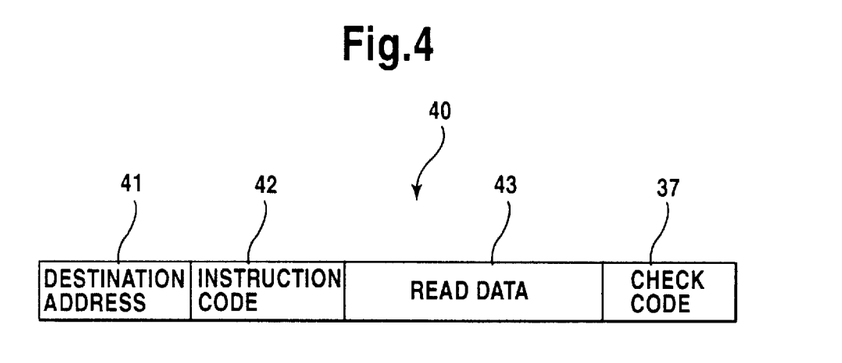
FIG. 4 is a diagrammatic view of a data packet transmitted in a read procedure.

A data packet 40 which is transmitted from the interface circuit 30 via the optical fiber 29 to the interface circuit 20 is represented in FIG. 4. As described, the data packet 40 contains a destination address 41, an instruction code 42, read data 43 and a check value or check code 37.

Just as in the case of the control instructions described in conjunction with FIG. 2, the destination address of the subscriber with the interface circuit 30 is thus a special destination address by means of which the interface circuit 30 reacts automatically. The interface circuit 30 reacts to the reception of the special destination address by virtue of the fact that the bit stream transmitted with this destination address goes through its CRC switching mechanism 35. The instruction code 41 is decoded and subsequently used in the CRC switching mechanism 35 to generate the check value, and the CRC switching mechanism 35 is subsequently used to generate the check value 37 for the values from the status registers 34. It is possible for the requesting subscriber, which contains the interface circuit 20, to see in this way whether the incoming data are being correctly transmitted when the check value 27 is correct.

Instead of the CRC switching mechanisms 25 and 35, it is also possible to use any other known error checking or error correcting circuits, in order to generate check codes or check values for monitoring the transmission. Those skilled in the art will know how to adapt the described circuit to other error checking methods. If necessary, a check value must also be transmitted when transmitting the data packet, that is to say in addition to the destination address and the instruction code. Empty bytes in the transmitted data packet are likewise not mandatory.

Figure 5:
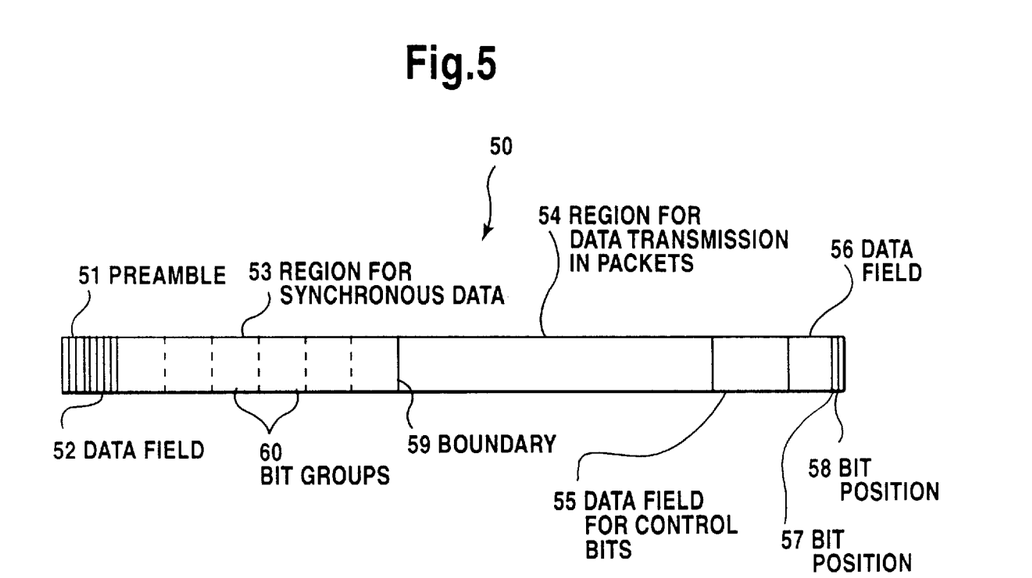
FIG. 5 is a detailed diagrammatic view of a bit group format particularly suitable for the invention.

A bit group format which is particularly suitable for transmitting the control instructions described in conjunction with FIG. 2 or the data packets 40 of FIG. 4 in the communication system is represented in FIG. 5.

A bit group 50, which is also termed a frame, comprises 64 bytes (512 bits). The bit group 50 contains a preamble 51, comprising 4 bits, which enables the PLL circuits of the subscribers lock onto the system phase and to be synchronized with a received clock pulse. In each case 16 bit groups 50 are combined to form a block, the first preamble 51 of each block containing a special block identifier bit. Following the preamble 51 is a data field 52, comprising 4 bits, whose function will be explained further below. Following the data field 52 is a region 53 for synchronous data, that is to say for source data which, by contrast with data packets, are transmitted in a continuous data stream such as is the case, for example, in various types of audio data. The region 53 can be subdivided in a known way into a plurality of component bit groups 60 of identical length, which in each case are assigned to a specific subscriber in the communication system. The assignment between the component bit groups 60 and the respective subscribers is fixed in the preamble 51.

Following the region 53 for synchronous data is a region 54 for data which are transmitted in data packets. To distinguish them from the synchronous data, the data transmitted in packets are also designated below as asynchronous data, although during transmission over the communication network they are bound to the clock pulse described by some subscriber. The region 53 for synchronous data and the region 54 for asynchronous data together occupy 60 bytes of the bit group 50. The total transmission capacity of the network for synchronous and asynchronous source data is formed by these 60 bytes. The size of the region 54 for asynchronous data can be 0, 4, 8, ... 56 or 60 bytes, and is fixed by a value ASY (ASY=0, 1, 2, ... 15) which is stored in the data field 52 which precedes the region 53 for synchronous data. The region 54 for synchronous data correspondingly comprises 60−(4×ASY) bytes. The value ASY can either be permanently preset or else set dynamically in accordance with the current requirement for transmission capacity for synchronous or asynchronous data.

The region 54 for asynchronous data is followed by a data field 55 for control bits, which has a size of 2 bytes (16 bits). The control bits of a block (32 bytes, 192 bits), form a check or control message. Following the data field 55 for control bits is a data field 56 which comprises 6 bits. A timing subscriber or clock pulse generator writes a "0" in the data field 56, and the value in the data field 56 is increased by one by each following subscriber in the ring, with the result that each subscriber (in this case a maximum of 64 subscribers) has direct knowledge of its position in the ring.

Following the data field 55 is a single bit position 57 which indicates whether a data packet in the region 54 for asynchronous data is continued or not in a bit group following the bit group 50. The bit position 57 is followed by a bit position 58 for a parity bit for error detection. Additional information regarding the bit groups and the data format here employed is found in our copending application Ser. No. (attorney docket No. TSP 96 P 14), the disclosure of which is herewith incorporated by reference.

The control instructions described in conjunction with FIG. 2 or the data packets 40 of FIG. 4 can be transmitted in a way known per se in the control bits of the data field 55. However, transmission via the regions 54 for asynchronous data permits faster transmission. In this case, a data packet is inserted in such a way into the region 54 for asynchronous data that it starts on the boundary 59 between the region 6 for synchronous data and the region 54 for asynchronous data. In the case when a data packet is longer than the region 54 for asynchronous data in a bit group 50, the rest of the data packet is transmitted in the bit groups following the bit group 50 and, if appropriate, in further bit groups. That situation is indicated by the flag at the bit position 57.

The component bit groups 60 form channels for synchronous data, i.e., for data transmitted in a continuous bit stream. A subscriber which would like to transmit via such a channel can use a read action described above to request a free channel from the subscriber which generates the clock pulse and which centrally manages the channel allocation. The clock pulse generator announces a table with the valid channel allocation cyclically to all the subscribers, preferably by means of control instructions of the type described further above, in order to write the table or parts thereof into appropriate registers of the individual subscribers. The subscriber requesting a free channel selects its free channel and transmits its synchronous data over that channel.

We claim:

1. In a communication system with a plurality of subscribers which are connected via respective interface circuits to a ring feeder, a method of transmitting in common digital source data and control data in a format which prescribes a pulsed sequence of individual bit groups of equal length, the method which comprises:

transmitting data in bit groups of equal length and subdividing the bit groups into component bit groups each forming a data channel;

assigning at least one of the data channels for control data which are transmitted in data packets including a destination address;

providing an interface circuit of each subscriber with an address decoder and an instruction decoder;

defining at least one of the subscribers with a special address by which a data packet received thereby is communicated directly to the instruction decoder in the interface circuit, and decoding, with the instruction decoder, bits of an instruction code contained in the data packet; and directly responding to an instruction in the instruction code and performing the instruction with the respective subscriber.

2. The method according to claim 1, wherein the instruction decoder comprises control registers and the method further comprises determining, with the control registers, operational states of the subscriber through the special address.

3. The method according to claim 1, which comprises defining at least one instruction as an instruction to store data transmitted in the data packet in the interface circuit of the subscriber with the special address.

4. The method according to claim 1, which comprises defining at least one instruction as an instruction to reset and/or calibrate the subscriber with the special address.

5. The method according to claim 1, which comprises defining a receiver for source data as the subscriber with the special address.

6. The method according to claim 1, which comprises defining at least one instruction as an instruction to transmit data stored in the interface circuit of the subscriber with the special address via the ring feeder.

7. The method according to claim 6, which comprises transmitting the data stored in the interface circuit in a data packet which also contains data from the received data packet.

8. The method according to claim 7, which comprises providing the data packet with a check code.

9. The method according to claim 1, wherein the interface circuits of all the subscribers are identical interface circuits.

10. The method according to claim 1, which comprises reserving an arbitrarily large contiguous region of a plurality of bit positions for source data inside a bit group for data which are transmitted in data packets.

11. The method according to claim 10, which comprises writing, with a data packet-transmitting subscriber, successive bits of a data packet to be transmitted in mutually adjacent bit positions which are reserved for data packet-transmitted data, and, if a given data packet contains more bit positions than the given contiguous region, writing the given data packet into a plurality of successive bit groups.

12. The method according to claim 1, which comprises reserving a contiguous region of bit positions for source data which are transmitted in a continuous data stream adjacent the region for the data packets, and defining and setting a boundary between the region for the source data transmitted in the continuous data stream and the region for the data packets.

13. The method according to claim 12, which comprises setting the boundary permanently in accordance with a defined transmission capacity.

14. The method according to claim 12, which comprises setting the boundary in real-time in accordance with a currently required transmission capacity.

15. The method according to claim 1, which comprises defining an instruction to transmit data stored in the interface circuit of the subscriber with the special address via the ring feeder, the instruction being a request for a free channel from a subscriber which would like to transmit source data to be transmitted in a continuous data stream.

16. The method according to claim 1, which comprises assigning each subscriber which is capable of transmitting source data which are transmitted in a continuous data stream with a special address and/or recognizing, with the respective subscriber, a special instruction by means of which address or instruction information for current channel allocation in a received data packet is written directly into appropriate registers.

17. The method according to claim 1, which comprises managing, with a single subscriber, complete information for a current allocation of channels for source data which are transmitted in continuous data streams.

18. The method according to claim 17, which further comprises generating a system clock pulse with the single subscriber.

19. The method according to claim 1, wherein the ring feeder is formed by optical fibers and the transmitting step comprises transmitting data between the subscribers through the optical fibers.

20. The method according to claim 1, wherein the communication system is disposed in a motor vehicle, and the transmitting step comprises transmitting data between individual devices in the motor vehicle.

* * * * *